United States Patent
Wang

(10) Patent No.: US 11,663,027 B2
(45) Date of Patent: May 30, 2023

(54) VIRTUALIZED NETWORK FUNCTIONS

(71) Applicant: Nokia Technologies Oy, Espoo (FI)

(72) Inventor: Laurence Wang, Qingdao (CN)

(73) Assignee: Nokia Technologies Oy, Espoo (FI)

( * ) Notice: Subject to any disclaimer, the term of this patent is extended or adjusted under 35 U.S.C. 154(b) by 294 days.

(21) Appl. No.: 16/954,071

(22) PCT Filed: Dec. 29, 2017

(86) PCT No.: PCT/CN2017/120098
§ 371 (c)(1),
(2) Date: Jun. 16, 2020

(87) PCT Pub. No.: WO2019/127452
PCT Pub. Date: Jul. 4, 2019

(65) Prior Publication Data
US 2021/0191747 A1    Jun. 24, 2021

(51) Int. Cl.
*G06F 9/455* (2018.01)
*H04L 43/0817* (2022.01)

(52) U.S. Cl.
CPC ...... *G06F 9/45558* (2013.01); *H04L 43/0817* (2013.01); *G06F 2009/4557* (2013.01); *G06F 2009/45595* (2013.01)

(58) Field of Classification Search
CPC ......... G06F 9/45558; G06F 2009/4557; G06F 2009/45595; H04L 43/0817; H04L 41/00; H04L 41/0806; H04L 41/12; H04L 41/0893; H04L 41/0803
USPC ............................................................. 718/1
See application file for complete search history.

(56) References Cited

U.S. PATENT DOCUMENTS

| | | | |
|---|---|---|---|
| 2015/0082308 A1* | 3/2015 | Kiess | G06F 9/45558 718/1 |
| 2017/0104609 A1* | 4/2017 | McNamee | H04W 4/24 |
| 2017/0134237 A1 | 5/2017 | Yang et al. | |
| 2017/0272523 A1* | 9/2017 | Cillis | H04L 41/082 |

(Continued)

FOREIGN PATENT DOCUMENTS

| | | |
|---|---|---|
| CN | 104811396 A | 7/2015 |
| CN | 105262664 A | 1/2016 |

(Continued)

OTHER PUBLICATIONS

Office action received for corresponding Korean Patent Application No. 2020-7022036, dated Jun. 11, 2021, 6 pages of office action and 5 pages of Translation available.

(Continued)

*Primary Examiner* — Kenneth Tang
(74) *Attorney, Agent, or Firm* — Harrington & Smith

(57) ABSTRACT

There is provided an apparatus comprising at least one processor and at least one memory including a computer program code. The at least one memory and the computer program code are configured to, with the at least one processor, cause the apparatus at least to receive from at least one further apparatus information associated with at least two virtual network functions, compare the information associated with the at least two virtual network functions to a determined rule, generate at least one function control based on the comparing, and assign the at least one function control to at least one of the at least two virtual network functions.

18 Claims, 6 Drawing Sheets

(56) References Cited

U.S. PATENT DOCUMENTS

| | | | |
|---|---|---|---|
| 2018/0060135 A1* | 3/2018 | Lacey | H04L 41/0803 |
| 2018/0295067 A1* | 10/2018 | Xia | H04L 41/5003 |
| 2018/0302343 A1* | 10/2018 | Lokman | H04L 41/122 |
| 2018/0316543 A1* | 11/2018 | Hwang | H04L 43/50 |
| 2018/0316730 A1* | 11/2018 | Schaefer | H04L 41/0883 |
| 2019/0028350 A1* | 1/2019 | Yeung | H04L 41/0895 |
| 2019/0052551 A1* | 2/2019 | Barczynski | H04L 41/40 |
| 2019/0273635 A1* | 9/2019 | McNamee | H04W 4/24 |
| 2020/0044919 A1* | 2/2020 | Yao | H04L 41/0806 |
| 2020/0136929 A1* | 4/2020 | Takla | H04L 41/5041 |
| 2020/0195553 A1* | 6/2020 | Yigit | H04L 43/50 |
| 2020/0412637 A1* | 12/2020 | Cherunni | H04L 45/42 |
| 2021/0111981 A1* | 4/2021 | Nahata | H04L 41/40 |

FOREIGN PATENT DOCUMENTS

| | | |
|---|---|---|
| CN | 105407057 A | 3/2016 |
| CN | 107005436 A | 8/2017 |
| CN | 107026802 A | 8/2017 |
| CN | 107209695 A | 9/2017 |
| CN | 107251486 A | 10/2017 |
| EP | 3179699 A1 | 6/2017 |
| KR | 1020160041631 A | 4/2016 |
| KR | 1020170030295 A | 3/2017 |
| KR | 1020170037623 A | 4/2017 |
| TW | 201728222 A | 8/2017 |
| WO | 2016/048430 A1 | 3/2016 |
| WO | 2017/011006 A1 | 1/2017 |
| WO | 2017/054197 A1 | 4/2017 |
| WO | 2017/144094 A1 | 8/2017 |

OTHER PUBLICATIONS

International Search Report and Written Opinion received for corresponding Patent Cooperation Treaty Application No. PCT/CN2017/120098, dated Sep. 25, 2018, 9 pages.

Extended European Search Report received for corresponding European Patent Application No. 17936546.5, dated Oct. 5, 2021, 9 pages.

"Network Function Virtualization (NFV) Management and Orchestration", GS NFV-MAN 001, V 0.6.3, Sep. 2014, pp. 1-197.

Office action received for corresponding Korean Patent Application No. 2020-7022036, dated Dec. 26, 2021, 4 pages of office action and 3 pages of Translation available.

"Network Function Virtualization (NFV) Management and Orchestration", GS NFV-MAN 001, V 1.1.1, Dec. 2014, pp. 1-184.

* cited by examiner

| Report Criteria | Report Action |
|---|---|
| Working load > 50% | Each outgoing flow status of this node (e.g. source/destination address, flow data rate, or application related info of this traffic) and the working load of this node (e.g. the usage of CPU, Memory, Network, or other resource etc....). |

302 → Report Criteria
304 → Report Action

Figure 3

VIRTUALIZED NETWORK FUNCTIONS

FIELD

Related Application

This application claims priority to PCT Application No. PCT/CN2017/120098, filed on Dec. 29, 2017, which is incorporated herein by reference in its entirety.

The present application is in the field of telecommunications. More particularly, the present application relates to apparatus and methods for the provision of virtualized networks within telecommunications.

BACKGROUND

Network Functions Virtualization (NFV) is a telecom led initiative that aims to utilize IT virtualization technology to consolidate many telecom network equipment types onto industry standard high volume servers, switches and storage. NFV involves implementing network functions in software that can run on a range of industry standard server hardware, and that can be moved to, or instantiated in, various locations in the network as required, without the need to install new proprietary equipment. With a promise to drive significant capital expenditure and operating expense reductions, NFV is poised to transform the entire telecom infrastructure ecosystem. Mind Commerce estimates that global spending on NFV solutions will grow at a Compound Annual Growth Rate (CAGR) of 46% between 2014 and 2019. NFV revenues are expected to reach $1.3 Billion by the end of 2019. As 5G evolves, NFV plays a critical role as building blocks and roadmap for an increasingly user-centric and on-demand dynamic delivery, business-aware operation and service-oriented architecture in the fundamental paradigm shifts.

With the development of communication networks many proposed new technologies, including large dense networks, interference and mobility management, Internet of Things (IoT), Software-Defined Networking (SDN), Network Functions Virtualization (NFV), pervasive and social computing, mobile ad hoc networks (MANET), cognitive radio, and cloud computing require significant data bandwidth. The bandwidth requirement for these devices therefore requires significant capacity from next generation networks and reconfiguration to avoid network bottlenecks may be required. For example, with NFV technology, many network functions may be highly virtualized, so that network hardware and software can be separated at most devices (such as servers, switches, routers and base stations), in order to reduce the cost of network deployment and aid configurability. Such networks, in which at least some of the network functions are virtualized with NFV technology, are referred to as virtualized networks.

STATEMENT OF INVENTION

According to an aspect, there is provided an apparatus comprising at least one processor and at least one memory including a computer program code, the at least one memory and the computer program code configured to, with the at least one processor, cause the apparatus at least to receive from at least one further apparatus information associated with at least two virtual network functions, compare the information associated with the at least two virtual network functions to a determined rule, generate at least one function control based on the comparing, and assign the at least one function control to at least one of the at least two virtual network functions.

In some embodiments, the apparatus may be an integrated virtualized network function management function.

In some embodiments, the information may comprise a routing path map and traffic status for at least two virtual network functions.

In some embodiments, the apparatus may be caused to transmit a message to the at least one further apparatus, wherein the apparatus may be caused to receive from at least one further apparatus information associated with at least two virtual network functions and may be caused to receive the information in response to the message transmitted to the at least one further apparatus.

In some embodiments, the apparatus may be caused to transmit a message to the at least one further apparatus and may further be caused to transmit the message based on local system data, the message may comprise at least one of a node ID for at least one virtual network function, and a lifecycle control management operation.

In some embodiments, the apparatus may be caused to generate at least one function control based on the comparing and may be caused to generate the at least one function control based on receiving status monitoring information from the at least one further apparatus in response to a request.

In some embodiments, the apparatus may be caused to generate at least one function control based on the comparing and may be caused to generate the at least one function control based on received status monitoring information.

In some embodiments, the apparatus may be further caused to transmit the at least one function control to the assigned at least one of the at least two virtual network functions.

In another aspect, there is provided an apparatus comprising at least one processor and at least one memory including a computer program code, the at least one memory and the computer program code configured to, with the at least one processor, cause the apparatus at least to receive information associated with at least two virtual network functions, process the information, and forward the information to at least one further apparatus, such that the at least one further apparatus is caused to compare the information associated with the at least two virtual network functions to a determined rule and to generate at least one function control based on the comparing.

In some embodiments, the apparatus may further be caused to receive a request for status monitoring information, and generate status monitoring information based on the request and transmit the status monitoring information to the at least one further apparatus.

In some embodiments, the apparatus may be caused to generate the status monitoring information and may further be caused to determine an impact node list comprising one or more virtual network functions effected by the at least one function control.

In another aspect, there is provided a method for an apparatus comprising receiving from at least one further apparatus information associated with at least two virtual network functions, comparing the information associated with the at least two virtual network functions to a determined rule, generating at least one function control based on the comparing, and assigning the at least one function control to at least one of the at least two virtual network functions.

In some embodiments, the apparatus may be an integrated virtualized network function management function.

In some embodiments, the information may comprise a routing path map and traffic status for at least two virtual network functions.

In some embodiments, the method may comprise transmitting a message to the at least one further apparatus. The method comprise receiving from at least one further apparatus information associated with at least two virtual network functions. The receiving may be in response to the message transmitted to the at least one further apparatus.

In some embodiments, the method may comprise transmitting a message to the at least one further apparatus. The method comprise transmitting the message based on local system data. The message may comprise at least one of a node ID for at least one virtual network function, and a lifecycle control management operation.

In some embodiments, the method may generate at least one function control based on the comparing. The method may comprise generating the at least one function control based on receiving status monitoring information from the at least one further apparatus in response to a request.

In some embodiments, the method may generate at least one function control based on the comparing. The method may comprise generating the at least one function control based on received status monitoring information.

In some embodiments, the method may comprise transmitting the at least one function control to the assigned at least one of the at least two virtual network functions.

In another aspect there is provided a method for an apparatus, the method comprising receiving information associated with at least two virtual network functions, processing the information, and forwarding the information to at least one further apparatus, such that the at least one further apparatus is caused to compare the information associated with the at least two virtual network functions to a determined rule and to generate at least one function control based on the comparing.

In some embodiments, the method may comprise receiving a request for status monitoring information, and generating status monitoring information based on the request and transmitting the status monitoring information to the at least one further apparatus.

In some embodiments, the method may comprise generating the status monitoring information and determining an impact node list comprising one or more virtual network functions effected by the at least one function control.

In another aspect, there is provided an apparatus comprising means for receiving from at least one further apparatus information associated with at least two virtual network functions, means for comparing the information associated with the at least two virtual network functions to a determined rule, means for generating at least one function control based on the comparing, and means for assigning the at least one function control to at least one of the at least two virtual network functions.

In some embodiments, the apparatus may be an integrated virtualized network function management function.

In some embodiments, the information may comprise a routing path map and traffic status for at least two virtual network functions.

In some embodiments, the apparatus may comprise means for causing a message to be transmitted to the at least one further apparatus, wherein the apparatus may comprise means for receiving from at least one further apparatus information associated with at least two virtual network functions and may comprise means for receiving the information in response to the message transmitted to the at least one further apparatus.

In some embodiments, the apparatus may comprise means for causing a message to be transmitted to the at least one further apparatus, optionally based on local system data. The message may comprise at least one of a node ID for at least one virtual network function, and a lifecycle control management operation.

In some embodiments, the apparatus may comprise means for generating at least one function control based on the comparing and may comprise means for generating the at least one function control based on receiving status monitoring information from the at least one further apparatus in response to a request.

In some embodiments, the apparatus may comprise means for generating at least one function control based on the comparing and may comprise means for generating the at least one function control based on received status monitoring information.

In some embodiments, the apparatus may comprise means for transmitting the at least one function control to the assigned at least one of the at least two virtual network functions.

In another aspect, an apparatus is provided, comprising means for receiving information associated with at least two virtual network functions, means for processing the information, and means for forwarding the information to at least one further apparatus, such that the at least one further apparatus is caused to compare the information associated with the at least two virtual network functions to a determined rule and to generate at least one function control based on the comparing.

In some embodiments, the apparatus may comprise means for causing a request for status monitoring information to be received, means for generating status monitoring information based on the request, and means for transmitting the status monitoring information to the at least one further apparatus.

In some embodiments, the apparatus may comprise means for causing generating the status monitoring information and may comprise means for causing to determine an impact node list comprising one or more virtual network functions effected by the at least one function control.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are also described in the following detailed description of examples embodying the invention and in the attached claims.

BRIEF DESCRIPTION OF FIGURES

FIG. 3 shows an example rule generated by the integrated virtualized network functions management assistance function (IVNFMAF) according to some embodiments;

DETAILED DESCRIPTION

Figure 1:
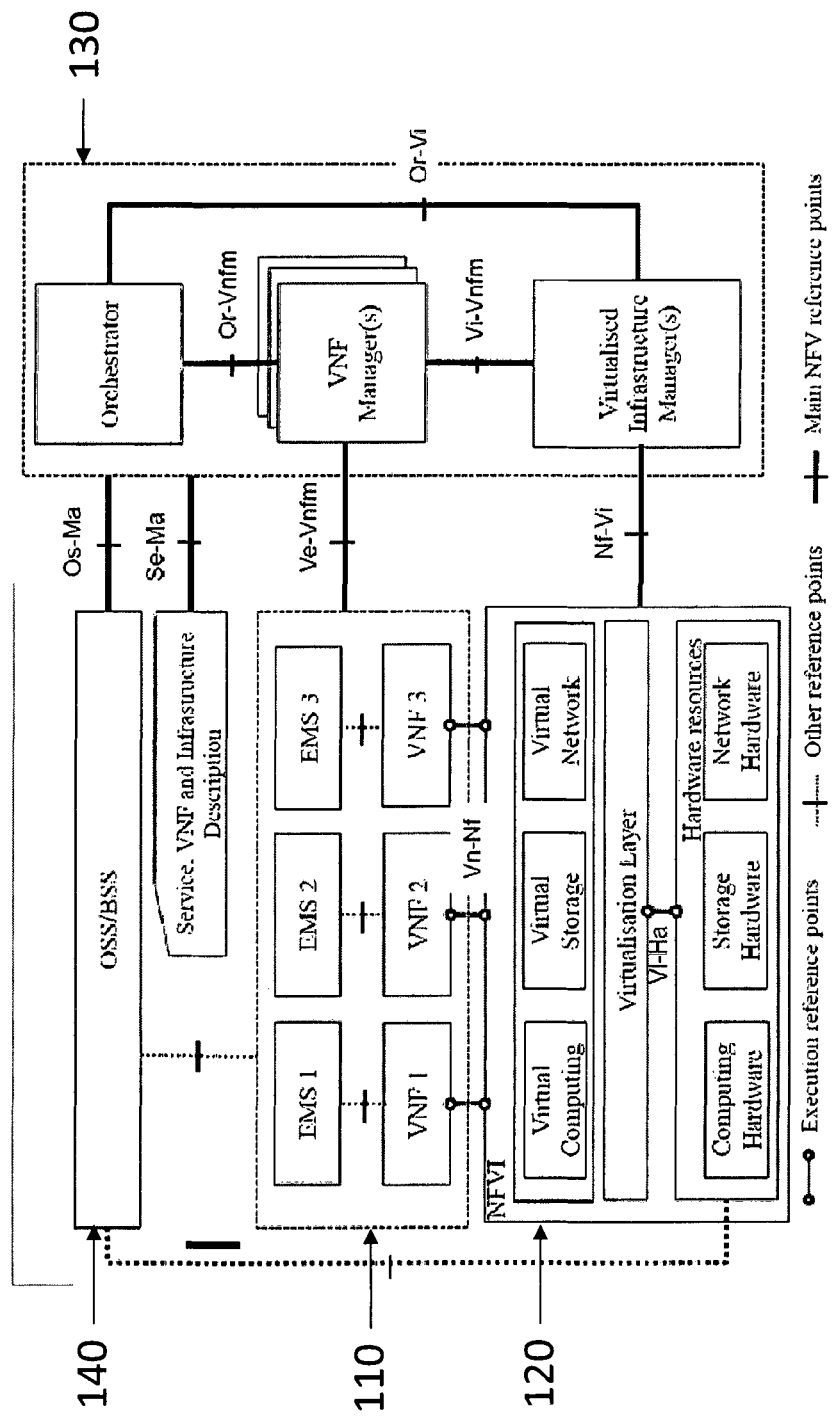
FIG. 1 shows a network function virtualization reference architecture.

In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

In traditional telecommunications Networks network elements (NE) are typically realized as individual entities running on dedicated servers or even in function-specific hardware (HW) boxes. That is each NE may comprise one or more physical elements. By nature such a setup is relatively rigid and stable (from a topological and implementation point of view), and once configured are relatively inflexible.

In telecommunications clouds the situation is different, at least in part due to the 'mobile' and dynamic (and not fully physically protected) nature of virtualized network functions (VNF), supported and accelerated by automated lifecycle management, as, for example, defined with European Telecommunications Standards Institute (ETSI) Network Functions Virtualization (NFV) based telecommunications cloud environments. In an NFV environment, a virtual network function (VNF) takes on the responsibility of handling specific network functions that run on one or more virtual machines (VMs) on top of the hardware networking infrastructure—routers, switches, etc. Individual virtual network functions can be connected or combined together as building blocks to offer a full-scale networking communication service. Typically, a VNF can be (re)instantiated from a "base image" in a matter of minutes and can be quickly moved or migrated to other virtualization platforms, suspended, or terminated as needed by flexible NW services. Moreover, ETSI NFV allows composing VNF from several VNF components (VNFC), which may come from the same vendor (or possibly also from trusted third parties, such as a subcontractor). In contrast to conventional NEs, the identity of a VNF or VNFC is variable, and should exist (and be valid) during a life-time of an individual VNF instance. For example, functional capacities can be expanded or shrunk by similar VNF instances when a new or higher performance VNF is sequentially launched or an existing one is terminated in a scaling process. Thus, network entities, their number as well as their configuration are more changeable in virtualized networks.

A Virtual Network Function Manager (VNFM) in an NFV system is a management function node. A VNF may be considered to be a node. The VNFM is responsible for the life cycle management (LCM) of each VNF in the NFV system. In managing each VNF, the VNFM may, for example, Instantiate (Create), Scale (In/Out), Upgrade, and Terminate (Destroy) a given VNF. The VNFM can provide a good balance between the VNF performance and cost by optimising resources. For example, a Virtual Network Function (VNF) node may be instantiated, by the VNFM, based on current workload, once the workload of the VNF exceeds a certain load threshold, VNF scaling operations may be applied under the control of VNFM to meet the demand of new workload. VNF scaling operations may be, for example, scaling out or scaling in to grow or reduce the capacity of the VNF. If the workload of a given VNF decreases, it may be terminated to make resources available for use in another VNF. A VNF based system is more flexible than non-NFV systems. It may be understood that the system built on VNF is able to provide higher capacity with lower cost than other non-NFV systems.

Virtualized network function (VNF) management solutions typically consider the needs of each VNF in isolation. Each VNF may process and route data from a plurality of service flow paths, each service flow path providing a path for data between different systems. Network overload may be common in many different networks, such as when mass concurrent data transmission occurs on the morning of a business day. In the event that network overload occurs, a VNF in the network detects the overload and is scaled out to grow its capacity for handling the incoming service request. The scaling out of one VNF often results in more traffic quickly being transferred to the downlink service nodes, this results in the transfer of overload along the whole service flow path in the network. If the downlink nodes haven't sufficient capacity for such handling, which may be particularly true if the NFV system is designed with cost saving in mind, it may result in an impact to a business, such as a drop in service or lost packets until a similar operation, such as scaling out, is applied along the whole service flow path. Other VNF life cycle management (LCM) operations like scaling in, Instantiation, Termination, Upgrade, may have similar issues typical VNF management solutions too.

This lack of cooperation among different virtualized network functions in life cycle management (LCM) is a pertinent issue in NFV systems, which try to achieve the best performance with low cost, and may reduce data throughput. The lack of cooperation is particularly inefficient in scenarios wherein the service flow path is long.

In some embodiments of the present application, cooperation among different virtualized network functions is provided. Such cooperation offers high performance with low cost, and increases data throughput. This cooperation is particularly effective in scenarios wherein the service flow path is long.

FIG. 1 shows an example European Telecommunications Standards Institute (ETSI) network functions virtualization (NFV) reference architectural framework. As shown in FIG. 1, the architectural framework comprises three main working domains, namely a Virtualized Network Function (VNF) domain 110, a Network Functions Virtualization (NFV) infrastructure (NFVI) domain 120, and a NFV Management and Orchestration domain 130. The architectural framework also comprises an OSS (Operation Support System) and/or BSS (Business Support System) 140 of an operator of virtualized networks.

The VNF domain 110 comprises at least one virtualized network function (VNF), each of which may be considered to comprise a virtualization of a network function. For example the function could be a GSM (Global System for Mobile) function or MME (Mobility Management Entity), gateway, firewall, HSS (Home Subscriber Server), or indeed any virtualizable function from core or access networks. The VNF could also be part of a modern/current/future network such as a 5G context. A VNF can be composed of multiple internal components. For example, one VNF can be deployed over multiple Virtual Machines (e.g. VNFCs), where each VM hosts a single component of the VNF. However, in other cases, the whole VNF can be deployed in a single VM as well. A VNF may be implemented as a software implementation (such as a software-only entity, or a SW part of a HW/SW function) of a network function, which is capable of running over the NFVI. Partly networked layers can be virtualized, too. In the VNF domain 110, an Element Management System (EMS) may be deployed to perform typical management functionalities for at least one VNF.

The NFVI 120 comprises the hardware and software components that build up the environment in which at least one VNF is deployed, managed and executed. The NFVI can span across several locations, i.e. places where NFV Infrastructure-Point of Presence are operated. The network providing connectivity between these locations is regarded to be part of the NFVI 120. From the perspective of a VNF, the virtualization layer and the hardware resources may look like a single entity providing them with desired virtualized resources. NFVI supports the execution of the at least one VNF with the diversity of physical resources which are virtualized.

In the NFVI domain 120, the physical hardware resources include computing, storage and networking that provide processing, storage and connectivity to at least one VNF through the virtualization layer (e.g. hypervisor). The computing hardware may be COTS (Commercial-Off-The-Shelf) as opposed to purpose-built hardware. Storage resources can be differentiated between shared network attached storage (NAS) and storage that resides on the server itself. Computing and storage resources are commonly pooled. Network resources are comprised of switching functions, e.g. routers, and wired or wireless links. Also, network resources can span different domains.

The virtualization layer abstracts, or separates, the hardware resources and decouples the VNF software from the underlying hardware, thus ensuring a hardware independent lifecycle for the at least one VNF. The virtualization layer may therefore be considered to be responsible for: Abstracting and logically partitioning physical resources, commonly as a hardware abstraction layer; enabling the software that implements the VNF to use the underlying virtualized infrastructure; providing virtualized resources to the VNF, so that the latter can be executed. The virtualization layer in the middle ensures that the at least one VNF is decoupled from hardware resources and therefore, the software can be deployed on different physical hardware resources. Typically, this type of functionality is provided for computing and storage resources in the form of hypervisors and virtual machines (VMs). A VNF may be deployed in one or several VMs.

The NFV Management and Orchestration 130 covers the orchestration and lifecycle management of physical and/or software resources that support the infrastructure virtualization, and lifecycle management of the at least one VNF. It may focus on all virtualization specific management tasks necessary in virtualized networks. From an NFV's point of view, virtualized infrastructure management comprises the functionalities that are used to control and manage the interaction of a VNF with computing, storage and network resources under its authority, as well as their virtualization. The virtualized infrastructure orchestration comprises the orchestration and management of NFV infrastructure and software resources, and realizing network services on NFVI.

Some embodiments provide a new VNF management solution in NFV. This VNF management solution may make decisions based on wider system data of the network, enabling a whole NFV system to be tuned using VNF lifecycle management (LCM) operations to avoid any possible negative impact and achieve the best performance with lower costs in the whole NFV system.

In some embodiments, a new Integrated VNF Management Assistance Function (IVNFMAF) may be introduced. The IVNFMAF may, based on the request of the enhanced VNFM or its local provisioning, maintain the routing path map and monitor the traffic status of the wider network. The IVNFMAF may, receive the service flow path query request from VNFM, and provide a VNF LCM operation suggestion from the view of the wider network.

It may be understood that Integrated VNF Management Functions may be introduced on VNFM to perform VNF LCM operations based on the suggestion from the IVNFMAF. The VNF LCM operation suggestion may, for example, be a function control message. The VNF management functions may perform one or more of the following functionalities: Monitor the working status of each VNF and trigger the VNF LCM operations if predefined LCM operations criteria are met or VNF LCM operation request is received from one VNF; Send Service Flow Path Query Request to the IVNFMAF for the suggestion from the view of the wider network; and Determine and perform appropriate VNF LCM operations based on the suggestion from the IVNFMAF and its local logic/provisioning. In some embodiments if VNF LCM operation is triggered by application logic, Working Load Controller Logic may be introduced on each VNF.

Figure 2:
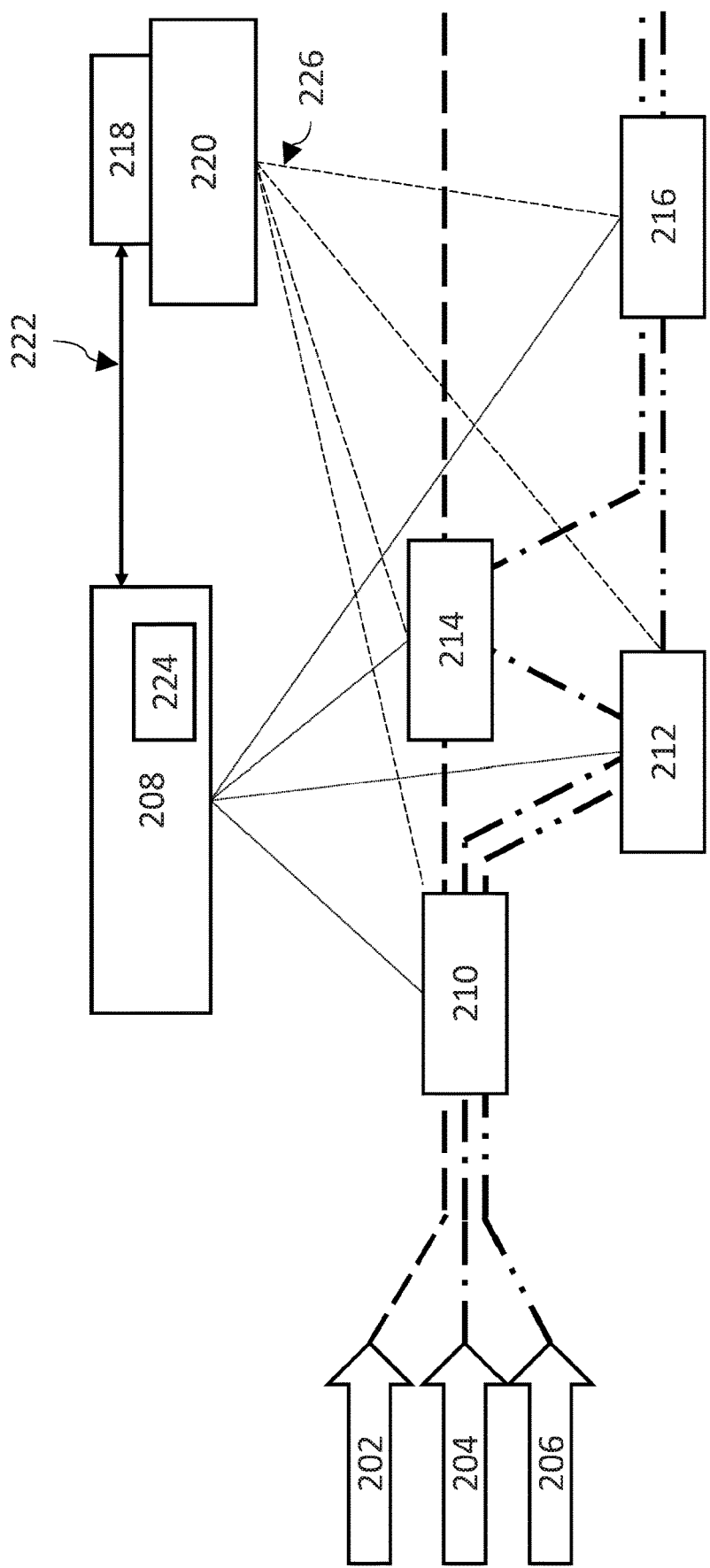
FIG. 2 shows a network architecture incorporating integrated virtualized network function management in accordance with some embodiments.

FIG. 2 shows a network architecture incorporating integrated VNF management functions in accordance with some embodiments. The VNF manager (VNFM) 208 is communicably coupled to at least one VNF 210, 212, 214, 216. Each VNF may process data received from a service flow path. FIG. 2 shows three service flow paths, a first service flow path 202, second service flow path 204, and a third service flow path 206. A service flow path may pass through one or more VNF 210, 212, 214, 216, each VNF that the service flow path passes through processes the data of the service flow path. For example, as shown in FIG. 2: the first service flow path 202 may pass through VNF 1 210, and VNF 3 214; the second service flow path 204 may pass through VNF 1 210, VNF 2 212, VNF 3 214, and VNF K 216; and the third service flow path 206 may pass through VNF 1 210, VNF 2 212, and VNF K 216. An Integrated VNF Management Assistance Function (IVNFMAF) 218 is provided, wherein the IVNFMAF 218 is configured to provide the wider system data for determining the impact of VNF LCM operations. The wider system data may comprise one or more of the working status of each node, and the traffic status of each node in the network that will be impacted by VNF LCM operations. In some embodiments, the IVNFMAF 218 is communicably coupled to a SDN (software-defined networking) controller 220. For example, the IVNFMAF 218 may be deployed at, or collocated with, the SDN controller 220. Deploying the IVNFMAF 218 with the SDN controller 220 may simplify the design of the IVNFMAF 218. The SDN controller 220 may have wider system data of the network. The SDN controller 220 may be configured to provide wider system data to the IVNFMAF 218. The IVNFMAF 218 may be configured to receive wider system data. Upon receiving the wider system data, the IVNFMAF 218 may determine an impact evaluation. For example, the wider system data may provide at least one of traffic information, and working load and the IVNFMAF may determine an impact evaluation based on the wider system data, or changes in the wider system data. A relationship between the traffic and working load of a VNF may be determined and the impact evaluation may be determined based on the relationship. One example of impact evaluation data is the relationship between the data flow rate and node working load. For example, based on the monitoring of the second service flow path, the IVNFMAF may determine that the impact of a 20% increase in data on the second service flow path causes the working load to increase 30% on the first VNF 210, 20% on the second VNF 212, 40% on the third VNF 214 and 10% on the $k^{th}$ VNF 216.

The VNFM 208 may be configured with an Integrated VNF Management Function (IVMF) 224 to monitor the working status of each VNF 210, 212, 214, 216 and apply VNF lifecycle management (LCM) operations based on the impact evaluation from the Integrated VNF Management Assistance Function (IVNFMAF) 218.

It may be understood that in some embodiments an interface 222 may be introduced between the VNFM 208 and the IVNFMAF 218 to support the network status monitoring provision and impact evaluation for VNF LCM operations. In some embodiments, the interface 222 may be a VNF Management Assistance Interface 222. The interface 222 is configured to provide a link between the IVMF 224 and the SDN Controller 220. That is to say, the interface 222 may provide a link between the VNFM 208/IVMF 224 and SDN Controller 220/IVNFMAF 218 to support the network status monitoring provision and impact evaluation for VNF LCM operations. It may be understood that in some embodiments if a VNF LCM operation is triggered by application logic, Working Load Controller Logic may be introduced on the respective VNF.

The IVNFMAF 218 provides the network impact evaluation for VNF LCM operations and the VNF LCM operation suggestion to VNFM 208. It may be understood that the VNF LCM operation suggestion provided to the VNFM 208 is an opinion determined by the IVNFMAF 218 based on available information, such as the information from the SDN controller. The IVNFMAF may, for example, determine operation suggestions based on wider system data. The wider system data may comprise one or more of the working status of each node, and the traffic status of each node in the network that will be impacted by VNF LCM operations. This functionality may be provided by a Network Status Function in IVNFMAF 218.

The suggestion, for example, may be that the IVMF wants scale out node 212 to increase capacity, the IVMF queries the IVNFMAF for a suggestion and IVNFMAF replies that the scaling out operation of node 212 may affect nodes 214 and 216, the additional info may indicate that the working capacity increase on node 212 would result in a increase in 30% working load on node 216. In the example where the existing working load of node 216 is 50%, an additional 30% working load increasing on node 216 may cause the node to be close to overload, or overloaded. In addition to scaling out 212, the IVMF may scale out node 216 too, to avoid overloading node 216. In another example, the IVNFMAF may indicate that node 216 is a PNF which cannot be scaled out, in this case, the IVMF may determine that the scale out operation of node 212 should be cancelled to avoid overloading later nodes.

The SDN controller 220 may comprise a SDN Southbound application programming interface (API). In some embodiments, the Network Status Function in the IVNF-MAF 218 enhances the existing SDN Southbound API 226. By way of example, the existing SDN Southbound API 226 may operate in accordance with the OpenFlow 226 communications protocol. The OpenFlow communications protocol may enable the SDN southbound API to determine the service flow path of network packets across at least one VNF. The network status function may provide a criteria based working status report mechanism. That is to say, IVNFMAF 218 may define the event report rules which are composed by report criteria and report actions. The event report rules may, for example, identify the information which should be reported and download these rules to the relevant network node as a working status monitoring request.

An example rule generated by the IVNFMAF is shown in FIG. 3. The example rule may comprise a report criteria 302 and a report action 304. The report criteria 302 in this example requires a determination of a node's working load. If the working load is determined to be greater than 50% the corresponding report action 304 is performed. In this example, if the working load is determined to be greater than 50%, the report action 304 performed is that each outgoing flow status of the node and the working load of this node is reported. The outgoing flow status may comprise at least one of the source address, the destination address, service flow path data rate, and application related info of this traffic. The working load of the node may comprise the utilisation of a resource, for example, the working load of the node may comprise the utilisation of at least one of the CPU, memory, and network.

To send a working status monitoring request to all of the network nodes may be considered to be inefficient. Some embodiments may incorporate IVMF provisioned working status monitoring/reporting, that is, IVMF may identify the potential nodes that need the LCM operations based on the wider system data and trigger the status monitoring in IVNFMAF for the relevant nodes.

Figure 4:
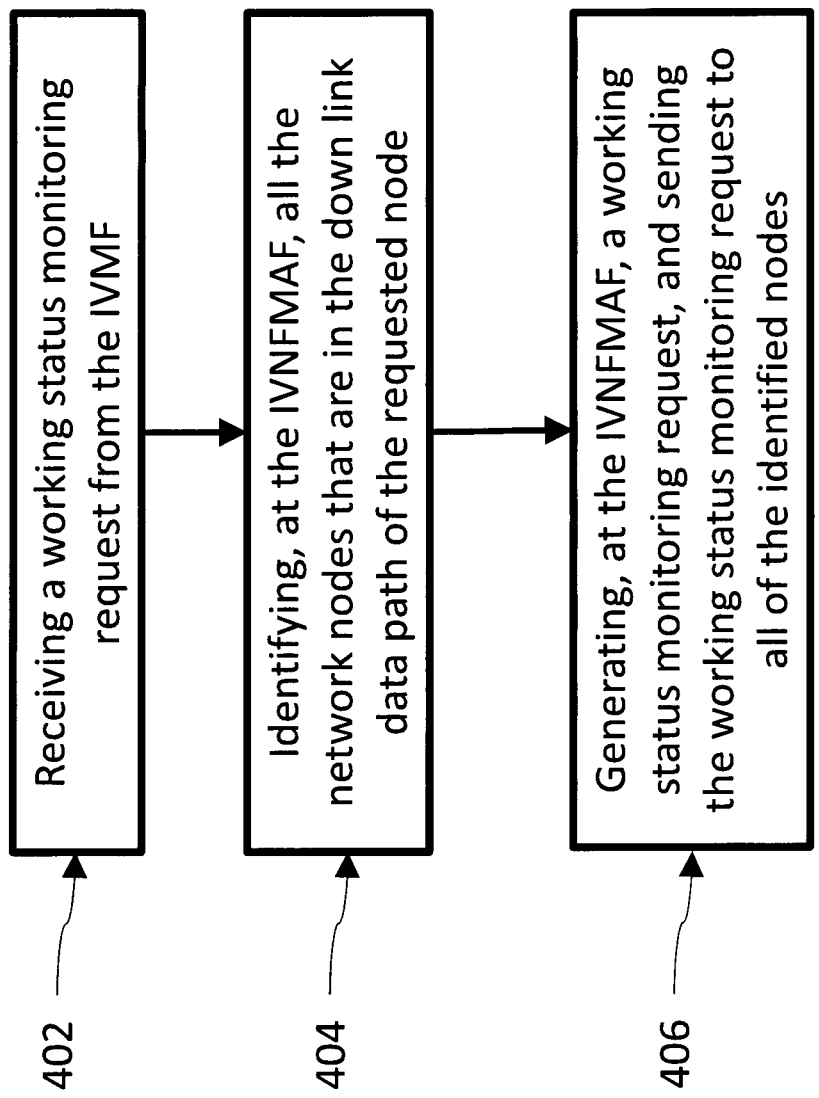
FIG. 4 shows a flow diagram of working status monitoring/reporting handling process implemented by an IVNF- MAF when a VNF Management Function trigger is received according to some embodiments.

FIG. 4 shows a flow diagram of working status monitoring/reporting handling process implemented by an IVNF-MAF when an IVMF trigger is received. In some embodiments, the IVNFMAF receives a working status monitoring request from the IVMF. The operation of receiving a working status monitoring request is shown in FIG. 4 by step 402. The IVNFMAF handles service flow paths when a working status monitoring request is received from IVMF. The IVNFMAF is configured to identify all of the relevant network nodes that are in the downlink service flow path of the requested node. The operation of identifying, at the IVNFMAF, all the network node that are in the downlink data path of the requested node is shown in FIG. 4 by step 404. The IVNFMAF may be configured to identify all the network nodes that are in the downlink service flow path of the requested node based on defined criteria. The IVNFMAF may be configured to identify all of the network nodes in the downlink service flow path of the requested node based on local system data of the IVMF. The IVMF data may provide the information to the IVNFMAF used to identify the node list that may need LCM operations. Local system data may, for example, include historical data for the node. Local system data may, for example, include that the working load is changed periodically in the historical data. The VNF Management Function (IVMF) may send the node list to the Integrated VNF Management Assistance Function (IVNF-MAF) for working status monitoring with optional monitoring criteria suggestions. Once the request is received, a Network Status Function in IVNFMAF generates a monitoring node list for each node received from the IVMF. The monitoring node list for each node received from the IVMF may identify all network nodes that in the downlink service flow path of the requested node. The IVNFMAF generates report rule(s) for each node identified in the monitoring node list and sends the rule(s) to network nodes as working status monitoring request. The operation of generating, at the IVNFMAF, a working status monitoring request and sending the working status monitoring request to all of the identified nodes is shown in FIG. 4 by step 406. The lifecycle management (LCM) Impact Evaluation Function in IVNFMAF may be responsible for providing VNF LCM operation suggestions once the service flow path query request is received from VNFM.

By way of example, with reference to FIG. 2, if the VNFM determines a network service node e.g. the first VNF 202 is overloaded and a scaling out LCM operation is needed, it will send the service flow path query request to IVNFMAF with the relevant node ID and the planned LCM operation type e.g. Scaling out. It may be understood that any LCM operation that is deemed to be necessary by the VNFM may be used, LCM operations that may be performed may include, for example, one or more of scaling out, scaling in, instantiation, termination, or upgrade.

Once the service flow path query request is received by the IVNFMAF from the VNFM with specific Node ID, the IVNFMAF is configured to identify the major cause or contributor to the LCM operation, for example, a scaling out operation because of overload in this case. In the example shown in FIG. 2, there are three service flow paths served by the first VNF 202. Service flow paths may be understood to be data flows, or data flow paths. The status monitoring of IVNFMAF is configured to determine that the major overload contributor in this case is the second service flow path. The IVNFMAF then is configured to identify all of the nodes that would be impacted by this scaling out operation. The nodes impacted in this example would be VNF 212, VNF 214, and VNF 216. The IVNFMAF 218 may then be configured to send the response to the VNFM 208, the response may comprise the impact node list, with all the nodes (i.e. VNF 2 212, VNF 3 214, and VNF K 216) identified by the IVNFMAF. In some embodiments, further to the impacted node list, the IVNFMAF may provide impact evaluation data for each node. One example of impact evaluation data is the relationship between the data flow rate and node working load. For example, based on the monitoring of the second service flow path, the IVNFMAF may determine that a 20% data increase on the second service flow path causes the working load to increase 30% on VNF 1 210, 20% on VNF 2 212, 40% on VNF 3 214 and 10% on VNF K 216. This impact evaluation data aids the VNFM in the lifecycle management (LCM) operation. The IVNFMAF may suggest that the planned LCM operation should be cancelled based on the wider system data. For example, the wider system data may suggest that nodes along the service flow path are unable to meet demand and cannot be scaled out to meet the additional demand. An example of a node that cannot be scaled out to meet additional demand is a PNF (Physical Network Function), which may not be able to be bypassed if it is in a key position along the service flow path.

To achieve the best performance from an NFV system while minimising the cost, all LCM operations should be managed and available such as, for example, one or more of scaling out, scaling in, instantiation, termination, and upgrade. It may be understood that it is advantageous for a customer to be able to deploy a common solution for all LCM operations, instead of a solution that can only apply one function, such as just scaling out.

In some embodiments, an integrated VNF management function may be provided. The integrated VNF management function (IVMF) on VNFM is responsible for monitoring the working status of each VNF and applying VNF LCM operations based on the impact evaluation from IVNFMAF. The IVMF may be formed using two software logics, for example, the IVMF may comprise two modules, such as, a VNF Status Function and a VNF LCM Management Function. Both modules may be implemented in software or hardware.

In some embodiments, a VNF Status Function may be provided. The VNF status function may for example be provided at the IVMF. The VNF Status Function identifies the node list that may require LCM operations to be performed and may trigger working status monitoring in IVNF-MAF. Based on the local system data of the IVMF, the IVMF may identify the node list that potentially needs LCM operations. The IVMF sends the node list to the IVNFMAF for working status monitoring with optional monitoring criteria suggestions.

In some embodiments, for each node in the node list that potentially needs LCM operations, the IVNFMAF identifies the nodes in the downlink service flow path. The nodes in the downlink service flow path may be impacted by the LCM operations of the IVMF. For example, with reference to FIG. 2, the IVMF may identify node 212 potentially needs LCM operations and therefore it triggers the working status monitoring in IVNFMAF with the node ID 212. The IVNFMAF may identifies that nodes 214 and 216 will be impacted by the LCM operation at node 212. The IVNFMAG monitor nodes 212, 214 and 216 accordingly.

The local system data to identify nodes that may require LCM operations may include at least one of: historical data about network node working load status; provisioning data from a local database, the provisioning data may be LCM related configuration data from the operator, for example, the operator may configure a node such that a specific LCM operation is performed when one or more criteria met; data from other network equipment which may be dependent on the networking standard in use, by way of example, this may be PCRF/PCF (Policy Control Function) in 5G, HSS/UDM (Unified Data Management) in 5G, or Application Function (AF) in a 3GPP Network.

In some embodiments, a VNF LCM Management Function may be provided. The VNF LCM Management Function may monitor the working status of each VNF, and apply VNF LCM operations based on the impact evaluation from IVNFMAF. It may be triggered by either its own monitoring of the working status of each VNF or the Working Load Controller Logic on each VNF.

Figure 5:
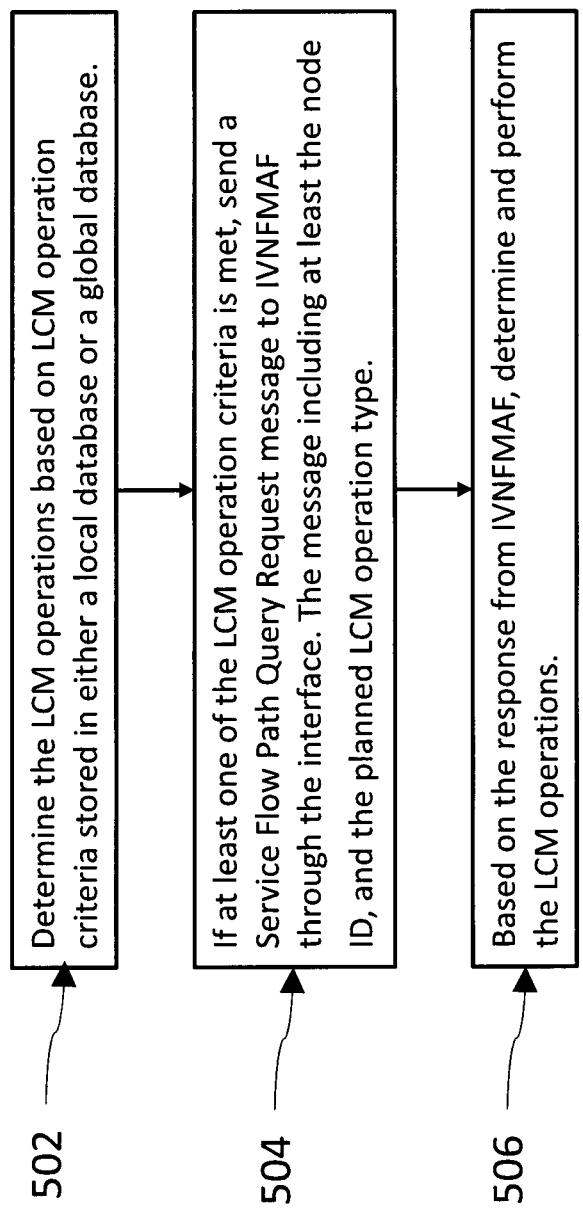
FIG. 5 shows a flow diagram of example operations of the virtual network function life cycle management function once a VNF overload is detected according to some embodiments.

FIG. 5 shows a flow diagram of the operations of the VNF LCM Management Function in the VNF Management Function (IVMF) once a VNF overload is detected.

In step 502, the LCM operations are determined based on the LCM operation criteria provisioned in either a local database, or a wider system database. The wider system database may be, for example, the HLR (Home Location Register) in 3G, the HSS (Home Subscriber Server) in 4G, or UDM (Unified Data Management) in 5G. The local database may be, for example, provided by the IVMF. The local database may comprise local system data.

HSS in 4G or UDM in 5G are databases which contain subscription-related information such as, for example, subscriber profiles and can provide information about the subscriber's location and IP information.

If at least one LCM operation criterion is met, a Service Flow Path Query Request message is sent to the Integrated VNF Management Assistance Function (IVNFMAF) through the interface (the interface as depicted by numeral

222 in FIG. 2). The message may include at least the node ID, and the planned LCM operation type. The LCM operation type may be, for example one of, scaling out, scaling in, instantiation, or termination. The operation of sending a service flow path query request message to the IVNFMAF through the interface (the interface as depicted by numeral 222 in FIG. 2) is shown in FIG. 5 by step 504. The message including at least the node ID, and the planned LCM operation type.

In step 506 the LCM operations are determined and performed based on the response from the IVNFMAF.

The response from the IVNFMAF, in relation to an identified node, may be impact evaluation data. The impact evaluation data may provide one or more of: a major overload contributor, this may identify the service flow path which is the main contributor to the overloaded node, for example, the service flow path transferring the most data; an impact node list, this identifies other nodes affected by the major overload contributor; and additional assistance information, this identifies the scale, or predicted scale of the affect the major overload contributor is having on the impact node list. In response to this information, the IVMF may perform an LCM operation based on the impact evaluation data, or additional assistance information, in addition to the LCM operation performed on the identified node.

By way of example, with reference to FIG. 2, it may be understood that the response from the IVNFMAF, in relation to the first VNF 210, may provide the following information: Major overload contributor: second service flow path (204); impact node list: VNF 2 212, VNF 3 214 and VNF K 216; additional assistance information: 20% data increasing on the second service flow path may cause the working load to increase 30% on VNF 1 210, 20% on VNF 2 212, 40% on VNF 3 214 and 10% on VNF K 216. In response to this information, the IVMF may scale out VNF 2 212, VNF 3 214, and VNF K 216 based on the impact evaluation data, or additional assistance information, in addition to scaling out VNF 1 210.

In some embodiments, working load controller logic is introduced on to each VNF if application logic triggers VNF LCM operation. The working load controller logic causes the VNFM to trigger the VNF LCM operation if the working load of the VNF node exceeds a predefined threshold, or upon receiving a request from an application on the VNF.

Figure 6:
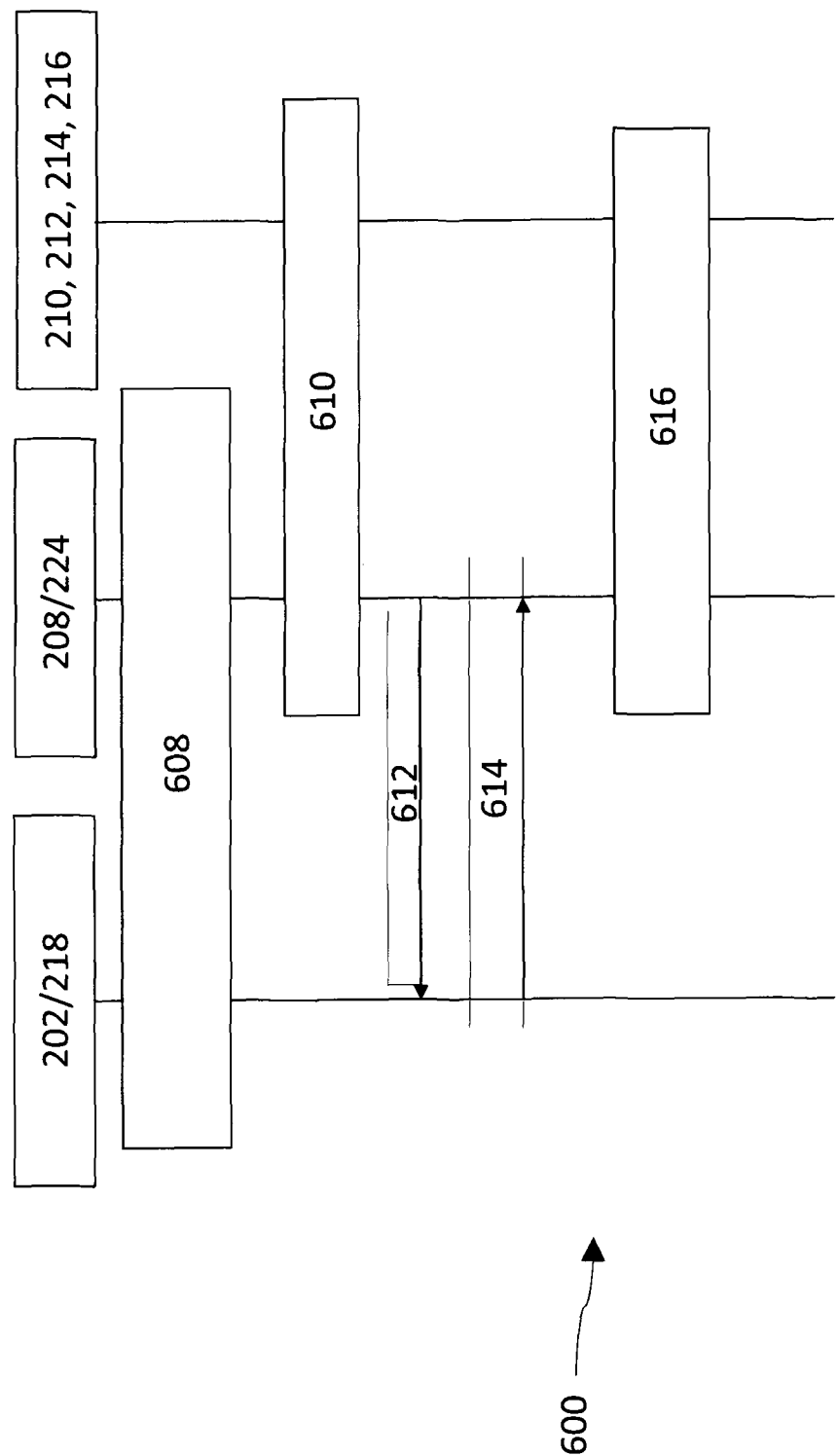
FIG. 6 illustrates the message flow of Integrated VNF Management in NFV according to some embodiments.

FIG. 6 illustrates the message flow of Integrated VNF Management in NFV according to some embodiments. The message flow of Integrated VNF Management in NFV 600 may be operations which occur between the SDN Controller 202/IVNFMAF 218, VNFM 208/IVMF 224, and at least one VNF Node 210, 212, 214, 216.

In step 608 the IVMF 224 identifies the node list that potentially needs LCM operations, based on the local system data of the IVMF. The local system data may be that of the IVMF 224. Local system data may, for example, include historical data for the node. Historical data for the node may be, for example, data relating to the working load of the node in the past, or data throughput of the node in the past. Alternatively and additionally, local system data may include trends, for example, the local system data may include that the working load is changed periodically in the historical data. It sends this list to IVNFMAF for working status monitoring with optional monitoring criteria suggestions. Alternatively, the IVNFMAF may trigger monitoring, if such request is not received from the IVMF. If such a request is not received from the IVMF 224, the IVNFMAF 218 may trigger monitoring based on information already received such as, for example, the node working load, a historical request from the IVMF 224, or a historical LCM suggestion. The IVNFMAF may update the monitoring once the request is received from IVMF.

In step 610 a VNF overload state is determined by one or more of the IVMF 224 or the Working Load Controller Logic on a VNF 210, 212, 214, 216.

In step 612, the IVMF 224 determines if the LCM operation criteria are met for at least one node on the node list. If the criteria are met, the IVMF 224 sends a Service Flow Path Query Request message to the IVNFMAF 218 through the interface (the interface is represented by 222 in FIG. 2). The message may include at least the node ID for the at least one node, and the planned LCM operation type for the at least one node. The planned (lifecycle management) LCM operation type may be, for example, one of: scaling out; scaling in, instantiation, or termination.

In step 614, the IVNFMAF 218 generates information, the information may include at least one of: a major overload contributor for the at least one node; an impact node list with all the nodes which will be impacted by the LCM operation performed on the at least one node; and additional assistance information. The additional assistance information may include prediction information relating to the expected working load changes on nodes other than the node ID for the at least one node identified. The generated information may be sent to the VNF Management Function (IVMF) 224. The generated information sent to the IVMF 224 may be responsive to the Service Flow Path Query Response.

In step 616, based on the response from IVNFMAF 218, the IVMF 224 determines and performs the relevant LCM operations. The relevant operations may comprise at least the planned LCM operation for the at least one node identified. Alternatively and additionally, the relevant operations may include LCM operations for at least one VNF identified in the additional information.

Embodiments may affect several ETSI NFV entities and reference points, and thus require some extensions regarding the protocols described. Also, an involved VNF may contain logic to enable interworking and usage of the data elements and attributes introduced with static/dynamic instance declarations.

Although the term suggestion is used throughout the description, it may understood that the suggestion may alternatively be described as an opinion.

An appropriately adapted computer program code product or products may be used for implementing the embodiments, when loaded on an appropriate data processing apparatus, for example for determining geographical boundary based operations and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It may be understood that while the above describes exemplifying embodiments of the invention with reference to VNF, a VNF may be replaced by any suitable node.

It should be understood that each block of the flowchart of the Figures and any combination thereof may be implemented by various means or their combinations, such as hardware, software, firmware, one or more processors and/or circuitry.

It is noted that whilst embodiments have been described in relation to one example of a Mobile Network Operator, similar principles maybe applied in relation to other examples of standalone networks, such as 2G, 3G, LTE or 5G. It should be noted that other embodiments may be based on other variants of cellular technology. Therefore, although certain embodiments were described above by way of example with reference to certain example architectures for wireless networks, technologies and standards, embodiments may be applied to any other suitable forms of communication systems than those illustrated and described herein.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

It is also noted herein that while the above describes exemplifying embodiments of the invention, there are several variations and modifications which may be made to the disclosed solution without departing from the scope of the present invention.

The invention claimed is:

1. An apparatus, comprising;
at least one processor; and
at least one memory storing instructions executed by the at least one processor to cause the apparatus at least to:
receive from at least one further apparatus information associated with at least two virtual network functions, wherein the information comprises a routing path map and traffic status for at least two virtual network functions;
compare the information associated with the at least two virtual network functions to a determined rule comprising at least one of a report criteria or a report action for at least determining a working load of each node associated with the at least two virtual network functions;
generate at least one function control based on the comparing; and
assign the at least one function control applying virtual network function life cycle management operations to at least one of the at least two virtual network functions.

2. The apparatus according to claim 1, wherein the apparatus is an integrated virtualized network function management function.

3. The apparatus according to claim 1, wherein the assigning is to only nodes of the each node that, based on at least the determined working load being greater than 50%, require life cycle management operations to the at least one of the at least two virtual network functions, and
wherein the at least one memory storing instructions is executed by the at least one processor to cause the apparatus to:
communicate a report action of the working load for each outgoing flow status of the nodes that require life cycle management operations.

4. The apparatus according to claim 1, wherein the at least one memory storing instructions is executed by the at least one processor to cause the apparatus to:
 transmit a message to the at least one further apparatus, wherein the apparatus caused to receive from at least one further apparatus information associated with at least two virtual network functions is caused to receive the information in response to the message transmitted to the at least one further apparatus.

5. The apparatus according to claim 4, wherein the at least one memory storing instructions is executed by the at least one processor to cause the apparatus to:
 transmit a message to the at least one further apparatus is further caused to transmit the message based on local system data, the message comprising at least one of: a node ID for at least one virtual network function; and a lifecycle control management operation.

6. The apparatus according to claim 1, wherein the at least one memory storing instructions is executed by the at least one processor to cause the apparatus to:
 generate at least one function control based on the comparing; and
 generate the at least one function control based on receiving status monitoring information.

7. The apparatus according to claim 6, wherein the at least one memory storing instructions is executed by the at least one processor to cause the apparatus to:
 generate the at least one function control based on the comparing is caused to generate the at least one function control based on received status monitoring information from the at least one further apparatus in response to a request.

8. The apparatus according to claim 1, further wherein the at least one memory storing instructions is executed by the at least one processor to cause the apparatus to:
 transmit the at least one function control to the assigned at least one of the at least two virtual network functions.

9. An apparatus, comprising:
 at least one processor; and
 at least one memory storing instructions executed by the at least one processor to cause the apparatus at least to:
  receive information associated with at least two virtual network functions; process the information,
  wherein the information comprises a routing path map and traffic status for at least two virtual network functions; and
  forward the information to at least one further apparatus, such that the at least one further apparatus is caused to compare the information associated with the at least two virtual network functions to a determined rule comprising at least one of a report criteria or a report action for at least determining a working load of each node associated with the at least two virtual network functions and to generate at least one function control based on the comparing.

10. The apparatus according to claim 9, further wherein the at least one memory storing instructions is executed by the at least one processor to cause the apparatus to:
 receive a request for status monitoring information; and generate status monitoring information based on the request; and transmit the status monitoring information to the at least one further apparatus.

11. The apparatus according to claim 10, wherein the at least one memory storing instructions is executed by the at least one processor to cause the apparatus to:
 generate the status monitoring information is further caused to: determine an impact node list comprising one or more virtual network functions affected by the at least one function control.

12. A method for an apparatus, comprising:
 receiving from at least one further apparatus information associated with at least two virtual network functions, wherein the information comprises a routing path map and traffic status for at least two virtual network functions;
 comparing the information associated with the at least two virtual network functions to a determined rule comprising at least one of a report criteria or a report action for at least determining a working load of each node associated with the at least two virtual network functions;
 generating at least one function control based on the comparing; and
 assigning the at least one function control to at least one of the at least two virtual network functions.

13. The method according to claim 12, wherein the information comprises a routing path map and traffic status for at least two virtual network functions.

14. The method according to claim 12, further comprising:
 transmitting a message to the at least one further apparatus, wherein receiving from at least one further apparatus information associated with at least two virtual network functions is in response to the message transmitted to the at least one further apparatus.

15. The method according to claim 14, wherein: transmitting a message to the at least one further apparatus is based on local system data, wherein the message comprises at least one of: a node ID for at least one virtual network function; and a lifecycle control management operation.

16. The method according to claim 12, further comprising: receiving status monitoring information from the at least one further apparatus in response to a request.

17. The method according to claim 16, wherein generating at least one function control based on the comparing is based on the received status monitoring information.

18. The method according to claim 12, further comprising:
 transmitting the at least one function control to the assigned at least one of the at least two virtual network functions.

* * * * *